United States Patent [19]
Johnson

[11] 3,836,304
[45]*Sept. 17, 1974

[54] MULTIPLE INJECTION BLOW MOLDING MACHINE

[75] Inventor: Joseph A. Johnson, Brigantine, N.J.

[73] Assignee: Jomar Industries, Inc., South Brigantine, N.J.

[ * ] Notice: The portion of the term of this patent subsequent to Sept. 12, 1989, has been disclaimed.

[22] Filed: June 6, 1972

[21] Appl. No.: 260,313

Related U.S. Application Data

[63] Continuation of Ser. No. 52,807, July 7, 1970, Pat. No. 3,690,799.

[52] U.S. Cl. .............. 425/242 B, 425/DIG. 205, 425/DIG. 209, 425/DIG. 211
[51] Int. Cl. .......................................... B29d 23/03
[58] Field of Search .......... 425/DIG. 205, DIG. 209, 425/DIG. 211, 242 B, 249, 387 B

[56] References Cited
UNITED STATES PATENTS

| | | | |
|---|---|---|---|
| 2,828,507 | 4/1958 | Strauss | 425/243 |
| 2,853,736 | 9/1958 | Gussoni | 425/324 B |
| 2,953,815 | 9/1960 | Mainardi | 425/DIG. 209 |
| 3,081,486 | 3/1963 | Skvorc | 425/247 X |
| 3,100,913 | 8/1963 | De Matteo | 425/DIG. 209 |
| 3,390,427 | 7/1968 | Ruekberg | 425/DIG. 209 |
| 3,555,598 | 1/1971 | Mehnert | 425/DIG. 205 |
| 3,609,803 | 10/1971 | Fattori | 425/DIG. 209 |
| 3,690,799 | 9/1972 | Johnson | 425/168 |
| 3,694,121 | 9/1972 | Johnson | 425/168 |
| 3,697,210 | 10/1972 | Johnson | 425/168 |
| 3,700,369 | 10/1972 | Johnson | 425/139 |

FOREIGN PATENTS OR APPLICATIONS

| | | |
|---|---|---|
| 916,327 | 1/1963 | Great Britain |
| 253,966 | 5/1963 | Australia |
| 866,378 | 4/1961 | Great Britain ............. 425/DIG. 232 |

*Primary Examiner*—Richard B. Lazarus
*Attorney, Agent, or Firm*—Stowell & Stowell

[57] ABSTRACT

An injection blow molding machine for automatically forming hollow articles of plastic material has a horizontally disposed rotatable and elevatable turret having distinct sets of hollow parison pins projecting from its six side faces and surrounded by 60° angularly spaced apart operating stations. The turret is indexed first 120° clockwise from an opposing pair of parison mold stations and then two cycles of 60° counterclockwise to an opposing pair of blow mold stations and to an opposing pair of ejection stations to cause the pins to successively operatively occupy such stations. Hydraulically actuated rams for the parison clamps at the parison mold stations and the shaft for the turret are linked together by a rack and pinion arrangement so that the synchronously operating rams lift the turret one half the distance of the movable mold halves whereby the pins clear the separated parison and blow mold halves as the turret is indexed. The hollow pins carry operating stems for the valves on the outer ends thereof with the turret ends of the pins having pressurized air inlets for air to act on the valve stems and to flow through the pins in the expansion of the parisons at the blow mold stations and the cooling of the blown articles at the ejection stations where the articles are mechanically stripped from the pins.

6 Claims, 13 Drawing Figures

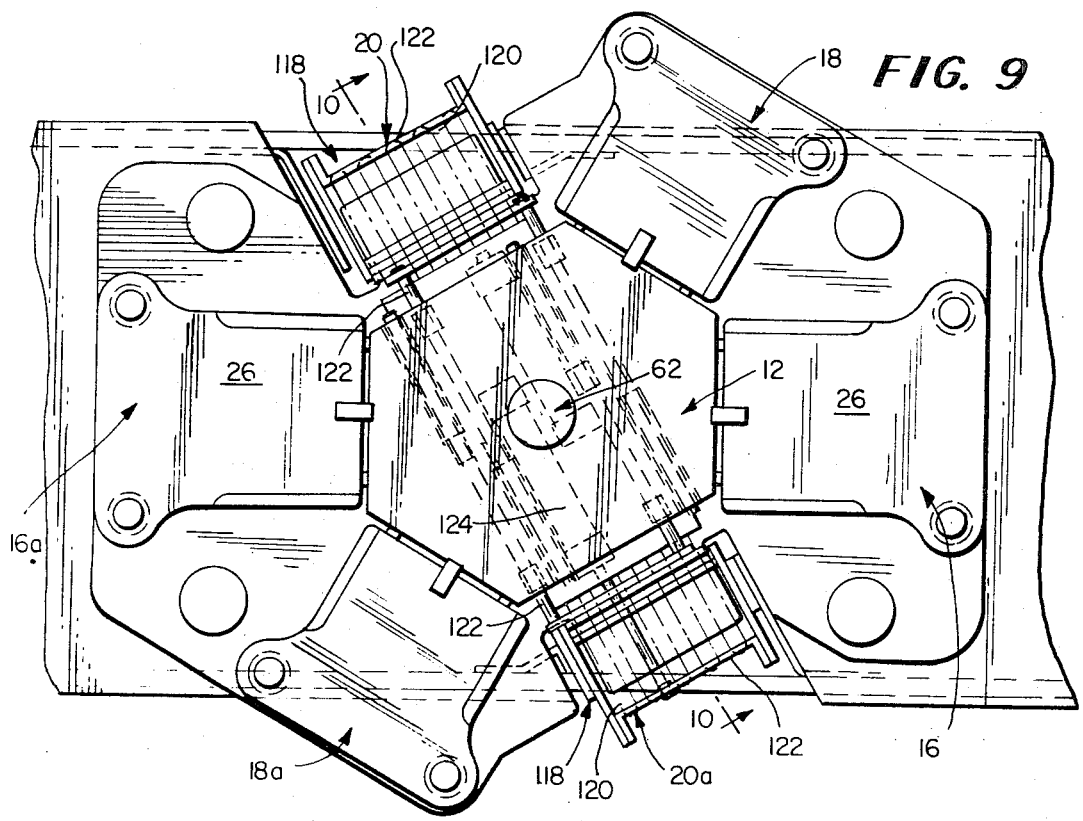
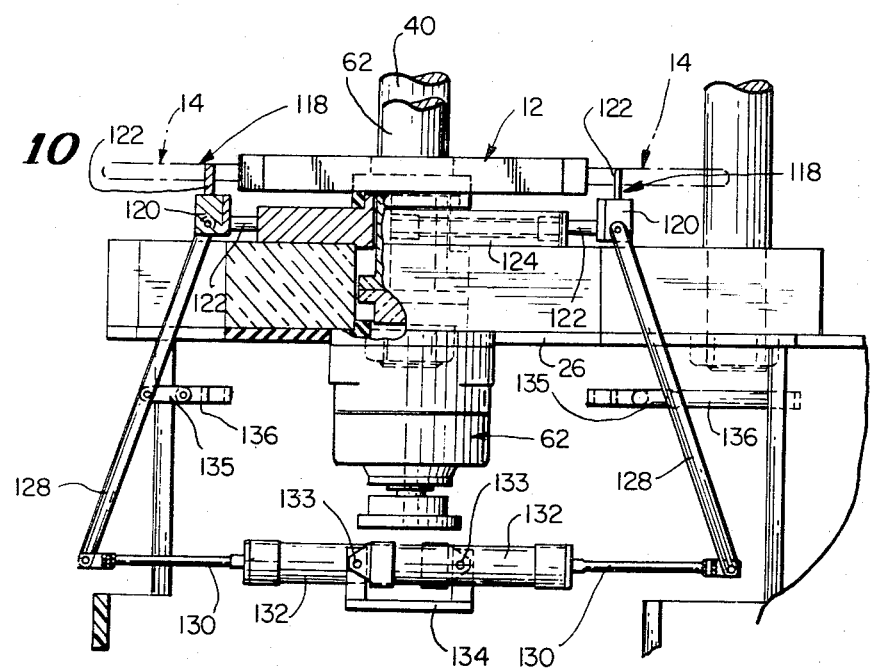

MULTIPLE INJECTION BLOW MOLDING MACHINE

This is a continuation, of application Ser. No. 52,807, filed July 1, 1970 now U.S. Pat. No. 3,690,799.

BACKGROUND OF THE INVENTION

1. Field Of The Invention

The present invention generally appertains to improvements in injection blow molding machines for automatically forming hollow articles, such as bottles, from plastic materials and more particularly relates to new and novel improvements in a multiple station injection blow molding machine.

2. Description Of The Prior Art

Injection blow molding machines that automatically operate to form a number of hollow articles, such as bottles, from plastic materials for fairly common in the art and in industrial usage. Such a machine has a number of operating stations surrounding a horizontally disposed elevatable and rotatable turret which has side faces carrying distinct sets of parison pins. The turret is surrounded by the angularly placed stations which include parison mold stations, blow mold stations and ejection stations. The turret is indexed from the parison mold stations, to the blow mold stations and then to the ejection stations to cause the parison pins to operatively successively occupy such stations with all stations being simultaneously operative.

Each parison mold station is composed of separable mold halves with the bottom halves being fixed on a platen and the movable upper halves being carried by rams that operate under a relatively high pressure. The rams clamp the mold halves together about the parison pins at a relatively high pressure and an injection unit injects plastic melt into the closed parison molds around the parison pins to a preset pressure. After the parisons are formed, the parison molds are opened with the rams lifting the upper movable mold halves away from the stationary bottom mold halves.

The turret is then raised to lift the pins from the bottom mold halves and the turret is indexed to bring the parisons to the blow mold stations where the parisons are located in blow molds. The blow molds also are divisible and are made up of lower mold halves fixed on the platen and movable upper mold halves that are carried by hydraulic rams that operate at a relatively low pressure so that the blow mold halves are clamped together by their rams at a relatively low pressure. With the parisons located in the blow molds pressurized air is passed through the parison pins to inflate the parisons to the configuration and size determined by the interior shape and size of the blow molds.

On completion of the blow molding, the turret is rotated in the same direction to bring the parison pins to the ejection stations where the formed articles are removed from the pins.

On such machines the use of two different clamp pressures, with the preform molds being clamped together at a high pressure and the blow molds being clamped together at a low pressure, has resulted in uneven loading of the press section of the machine and has caused unsatisfactory press operation.

Another problem that has been encountered with such machines lies in the separation of the halves of the parison or preform molds and the associated elevation and indexing of the turret carrying the parison pins. Unfortunately, the mold halves open independently and the turret is lifted independently so that proper clearance for the pins is not always provided.

A further problem that affects the proper automatic operation of such machines resides in the valve arrangements at the outer ends of the hollow parison pins. Such valves are usually common spring biased one-way valves mounted at the outer ends of the pins and the valves have a tendency to become stuck with the plastic material, that the valves prevent from entering the pins, accumulate on the ends of the pins. The valves do not operate quickly and smoothly at all the stations.

Another problem has been encountered with the valves in connection with the ejection of the formed articles from the pins at the ejection stations since pressurized air is used to blow the articles from the pins. This use of pressurized air tends to result in a slow ejection and also such ejection is not fully dependable when the articles sometimes become stuck on the pins.

SUMMARY OF THE INVENTION

The primary object of the present invention is to provide a machine that overcomes and eliminates the problems of known machines and that operates at a dependably fast production rate.

Consanant with such objects, other objects of the present invention are to provide such a machine with synchronized movements between the parison molds and the turret, with an easily and reliably functioning valve arrangement for the parison pins and with mechanical means for positively stripping the formed articles from the pins at the ejection stations.

Generally stated, in a preferred embodiment of an injection blow molding apparatus in accordance with the present invention, each parison clamp comprises a fixed lower half and an elevatable upper half which is carried by a pressure plate or pad attached to the lower end of a hydraulic ram. The rams are provided with racks that are engaged by pinions on a cross shaft arranged interconnectingly between the rams so that the hydraulically actuated rams operate in unison. The cross shaft also has a pinion that is enmeshed with a rack on the elevatable and rotatable shaft for the parison pin carrying turret. The pinion engaged with the turret shaft rack has less teeth than the pinions for the ram racks with the turret pinion having one-half the number of teeth as the identical pinions for the ram racks. The rams operate synchronously by virtue of the mechanical tie therebetween in the form of the racks and pinions and also control the lifting of the turret with the turret being elevated by the rams one-half the opening movement of the upper mold halves. This will permit the pins to clear the molds as the turret is indexed to the blow mold stations.

Each of the parison pins has an axial bore closed off at its outer end by a valve and has its inner turret end provided with air inlets registerable with a passage for pressurized air in the turret. A valve stem for the valve is slidable in the bore and is controlled by a spring assembly at its inner end and by the air pressure acting on its inner end. The valve is formed to complement the outer end of the pin in its parison forming function at the preform mold station and is held in a closed position at the preform or parison mold station by a spring arrangement acting on the inner end of the valve stem. At the blow mold stations the valve is opened to permit the passage of pressurized air into the parison by means of pressurized air acting on the inner piston end of the valve stem so that the valve is quickly, positively and completely unseated at the blow mold stations. The valve is also opened at the ejection stations so that the air can cool the parison pins.

At the ejection stations the parison pins fit in the crotch of U-shaped stripped fingers that are carried by a mechanical linkage actuated by hydraulic cylinders. The fingers engage under the pins at the turret ends thereof and are moved outwardly along the length of the pins by the linkage under the actuation of the hydraulic cylinders. In so moving along the axial extent of the pins the fingers positively strip the formed articles of the pins with the fingers pushingly abutting the inner ends of the articles.

By virtue of the provision of the synchronized interconnection between the parison clamp cylinders and the turret it can be appreciated that the transfer of the parisons from the preform mold stations to the blow mold stations can be effected more dependably and expeditiously than before possible. Also, because of the valve stem arrangements it can be understood that the valves will operate more efficiently and quickly than before possible and with the mechanical stripper arrangement at the ejection stations the formed articles will be removed from the pins in a positive and faster manner.

In operation, the separable upper halves of the parison molds are moved downwardly and, simultaneously, the turret is moved downwardly until the parison mold halves clamp around the parison pins. At the same time, the movable upper halves of the blow molds are moved downwardly at a slower rate of speed to clamp around the parison carrying pins in the blow mold stations. Plastic melt is injected into the opposing sets of parison molds and around the pins therein by means of plastifier units through manifold systems and through orifices in the ends of the parison molds. The opposing sets of pins on which slugs of material have been previously formed in the parison molds are located in the blow molds where the slugs are blown and articles in the ejection stations are stripped from the pins.

After a preset time for injection and air blowing, the blow molds are opened followed by the opening of the parison molds. The parison molds through the rack and pinion arrangement raise and the turret and its pins are lifted to a point equidistant between the two halves of the parison molds. The turret shaft rotates the turret 120° clockwise, as the shaft is driven by an electric or hydraulic reversible motor or other rotary actuator that has built in 120° cyclic clockwise and counterclockwise movement, placing the pins formerly in the parison molds into the blow molds. The pins formerly in the blow molds are transferred to the ejection stations and the pins formerly in the ejection stations and now clean are transferred to the parison mold stations. The cycle is repeated and when the molds open, the turret is rotated by its shaft 60° counterclockwise with the 120° motor having its full action braked at the halfway point by a 60° stop arrangement. After the second parison forming and blow cycle the turret shaft rotates the additional 60° in completing the 120° return movement thereof and effects a repeat of the inject, blow and eject cycle. The rotation of the turret is repeated continuously first 120° clockwise and then two cycles of 60° counterclockwise.

Further objects of the present invention are to transfer the parisons from one station to another in smoothly and rapidly functioning cycles, to enable the parisons to be transferred from the parison mold stations to the blow mold stations without any possibility of interference therewith, to effect the blowing of the parisons at the blow mold stations at a faster and more dependable rate and to remove the formed articles at the ejection stations more dependably and constantly.

BRIEF DESCRIPTION OF THE DRAWINGS

FIG. 9 is a view similar to, but in greater detail than FIG. 6, and showing in top plan the stations with the stripper means at the ejection stations being shown in top plan.

FIG. 10 is a vertical sectional view taken on line 10—10 of FIG. 9 and showing in side elevation the stripper means for the pins at the ejection stations.

DESCRIPTION OF THE PREFERRED EMBODIMENT

Figure 1:
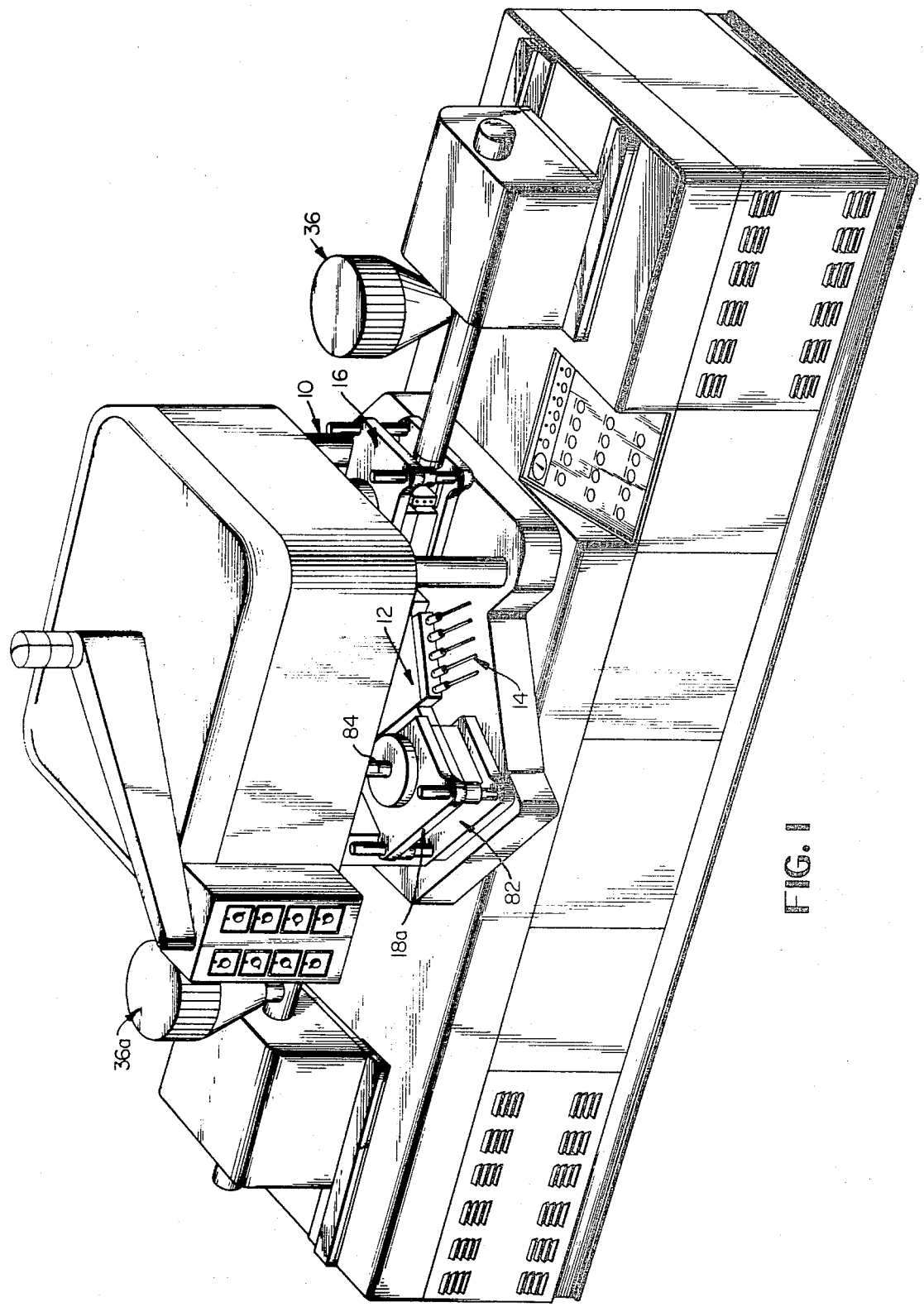
FIG. 1 is a perspective view of the entire machine formed in accordance with the present invention.
Figure 2:
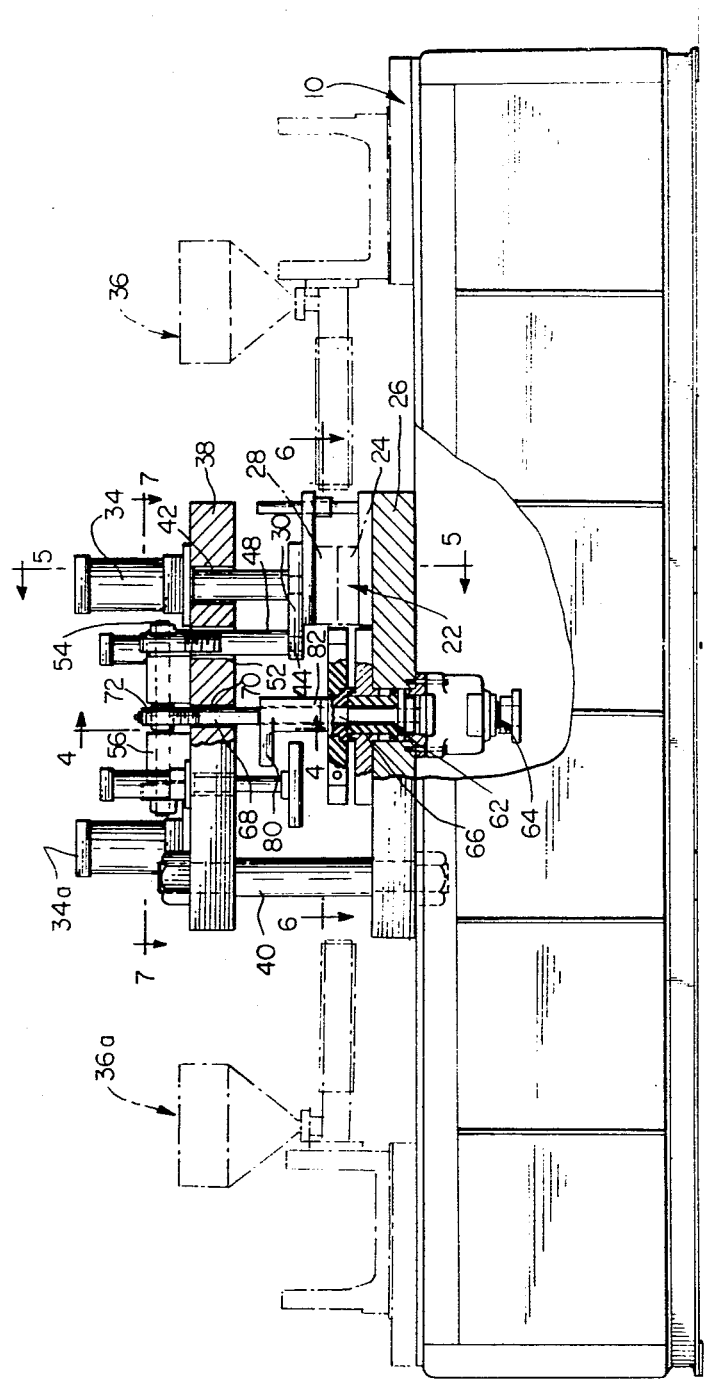
FIG. 2 is a front elevational view of the machine with parts broken away and shown in vertical section and with parts shown in dotted lines.
Figure 3:
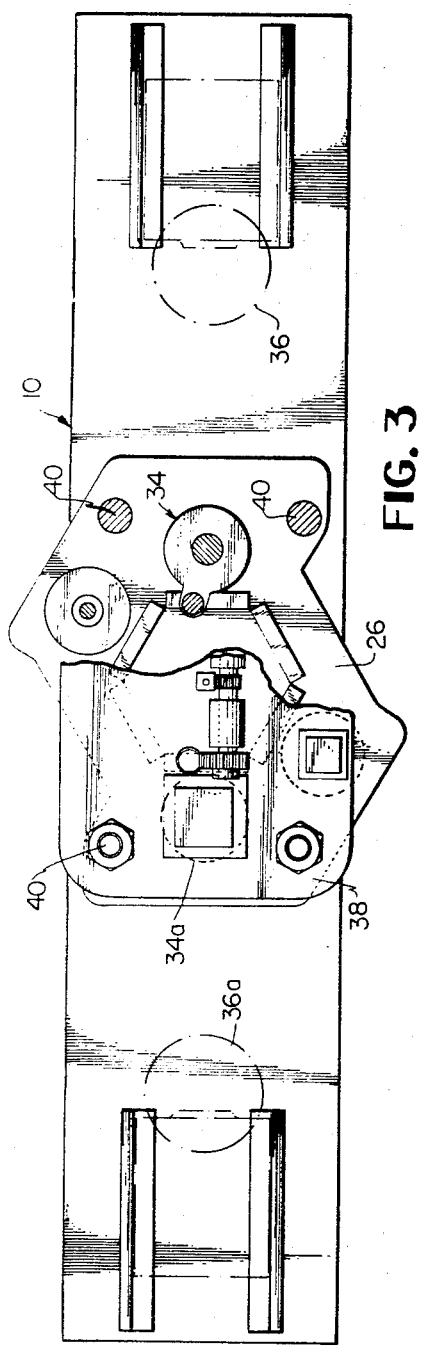
FIG. 3 is a top plan view of the machine shown in FIG. 2.

Referring now more particularly to the accompanying drawings and initially to FIGS. 1 and 2 for a general understanding of the injection blow molding apparatus or machine generally designated by the numeral 10, it can be appreciated that such apparatus is of the automatic type having a hexagonal turret 12 with its six faces carrying distinct sets of parison pins 14. The turret is indexed in a manner to be described to bring the pins to oppositely located preform or parison mold stations 16 and 16a, then to oppositely located blow mold stations 18 and 18a and finally to oppositely located ejection stations 20 and 20a in a full 120° clockwise cycle and then in two 60° counterclockwise return cycles. The six stations are spaced 60° apart and surround the turret and are simultaneously operative with two opposing sets of parison pins being processed in the parison mold stations while two opposing sets of pins are in the blow mold stations and two other opposing sets of pins are being acted upon in the ejection stations.

Each of the preform mold stations includes a parison clamp 22 which comprises a fixed lower half 24 parison mold that is mounted on a stationary platen 26 and a movable complimentary upper half 28 parison mold that is carried by a pressure pad 30 attached to the outer end of the ram or piston rod 32 of a hydraulic cylinder 34 and 34a. Thus, when the piston rod at each preform mold station 16 and 16a is brought down hydraulically the parison mold halves 24 and 28 at each preform mold station close about the associated parison pins to define a cavity. Such cavity is filled with heated plastic material from an injection unit 36 and 36a and the material is fed to the cavity under pressure for a set period of time.

The rams 32 and 32a operate under a relatively high pressure and, in accordance with this invention, some of the operating pressure is utilized to raise and lower the turret. Thus the turret and its pins are raised by the parison mold rams 32 and 32a each time the parison molds and the blow molds are opened.

Each of the hydraulic cylinders 34 and 34a is vertically mounted on a head plate 38 that is fixed horizontally above the platen 26 by vertical tie bars 40 connected to the platen. The cylinders 34 and 34a are in diametrically opposite relation and the rams 32 and 32a thereof workingly extend through vertical openings 42 formed in the head plate 38. The pressure pads 30 and 30a carried by the rams 32 and 32a are formed with radially projecting peripheral offsets 44 and 46 that face inwardly toward each other and constitute supports for upstanding vertical rack bars 48 and 50 which are slidably positioned alongside and parallel with the rams and which pass through vertical openings 52 in the head plate.

A synchronizing or equalizing shaft 54 is rotatably arranged transversely between the cylinders 34 and 34a and is horizontally rotatably mounted in bearing sleeves 56 mounted on the upper face of the head press plate 38. The shaft 54 has pinions 58 and 60 fixedly circumposed on its outer ends with the pinions being in meshing engagement with the rack bars 48 and 50. Thus, the high pressure rams 32 and 32a are mechanically interconnected for operation in unison. This will ensure proper operation even if one ram is not supplied properly with hydraulic actuating fluid.

The turret 12 is supported by a rotatable shaft assembly 62 which has an electric motor 64 operatively associated with its lower end portion so as to rotate the turret first 120° clockwise and the 120° counterclockwise, the latter rotary action being braked into two 60° cyclic movements in a manner to be described. The shaft assembly includes an upper vertically reciprocable splined shaft 66 that has an upper portion 68 extended through a vertical opening 70 formed in the press plate 38 intermediate the openings 42. The turret shaft has its upper portion 68 formed as a rack bar 72 which lies parallel with and substantially centrally between the rack bars 48 and 50. The equalizing shaft 54 is provided substantially at its center and midway between the end pinions 58 and 60 with a pinion 74 that is fixed on the shaft. The pinion 74 is enmeshed with the turret rack bar 72 and is formed with teeth 76 that are of a number exactly one-half less than the teeth on the pinions 58 and 60. Thus, for example, the pinions 58 and 60, which are identical, have 36 teeth while the pinion 74 has 18 teeth. This means that the rack bars 48 and 50 will move an equal distance but the rack bar 72 will move one-half the distance of the rack bars 48 and 50. Consequently, in operation, the rams 32 and 32a will move in complete unison at the same rate and at the same distance in lifting the upper halves 28 of the parison molds. The greater power of the rams is also used to lift the turret but the turret is only raised one-half of the distance of the mold halves 28. This upward movement of the turret will be sufficient for the parison pins carried thereby to clear the open parison and blow molds as the turret is indexed by the motor 64 to move the parison pins to and from the parison and blow molds. The centerline of the parison pins is always equidistant between the part line of the parison and blow mold halves.

Figure 6:
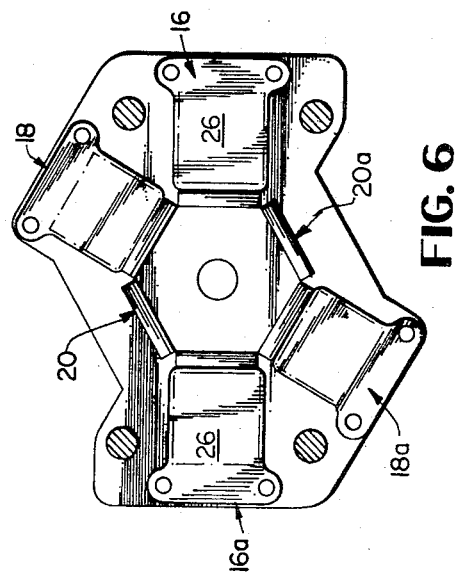
FIG. 6 is a horizontal sectional view taken on line 6—6 of FIG. 2 and showing the preform mold stations, the blow mold stations and the ejection stations of the machine.
Figure 5:
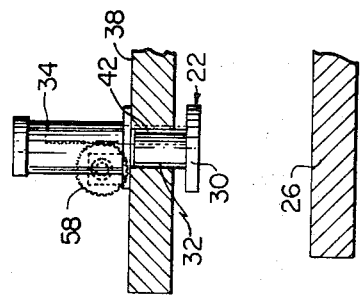
FIG. 5 is a vertical sectional view of one of the parison mold clamp rams as taken on line 5—5 of FIG. 2.
Figure 4:
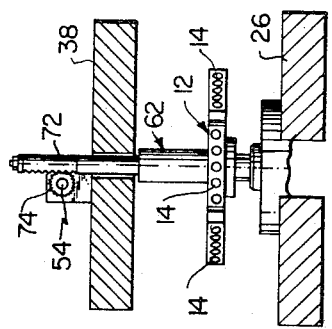
FIG. 4 is a vertical sectional view of the turret shaft assembly as taken on line 4—4 of FIG. 2.
Figure 7:
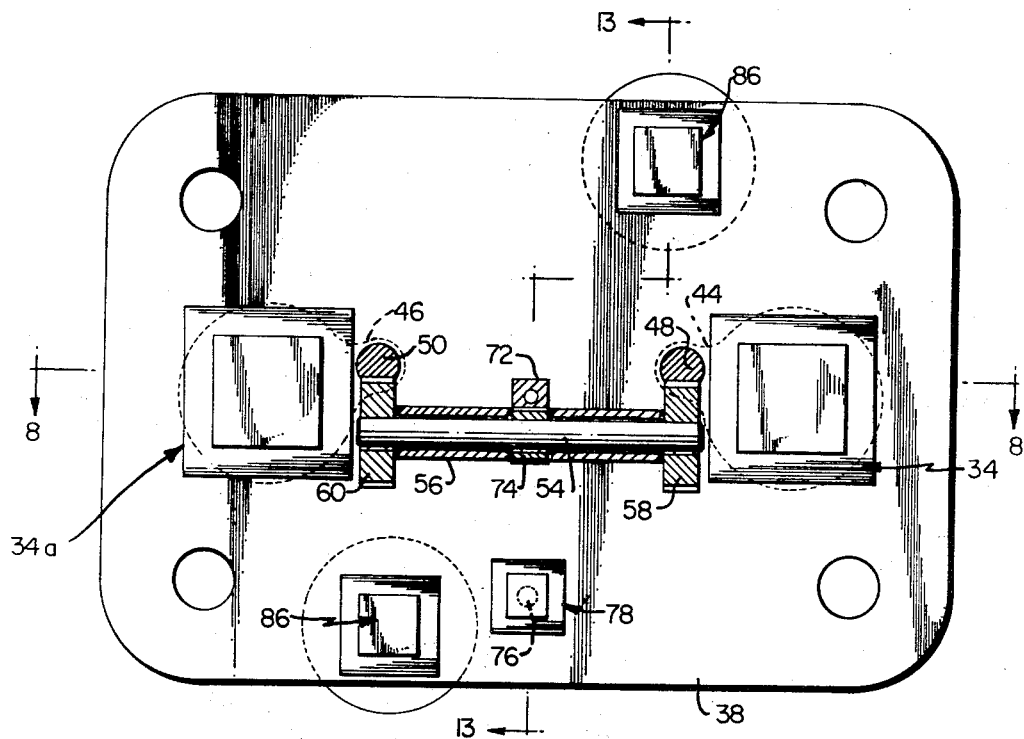
FIG. 7 is a horizontal sectional view taken on line 7—7 of FIG. 2 and showing the rack and pinion interconnection between the rams and the turret.
Figure 8:
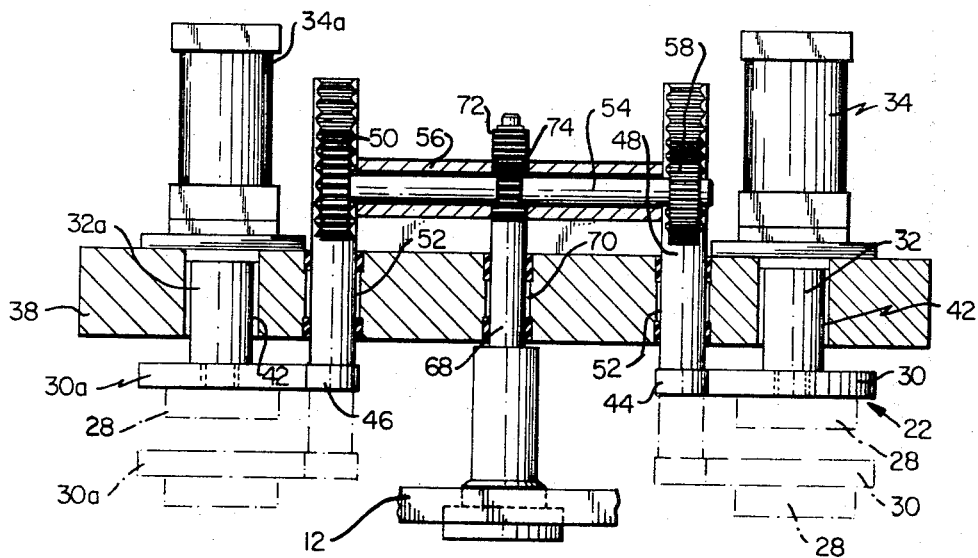
FIG. 8 is a vertical sectional view taken on line 8—8 of FIG. 7 and showing in greater detail the interconnecting rack and pinion arrangement between the parison clamp rams and the pin carrying turret.
Figure 11:
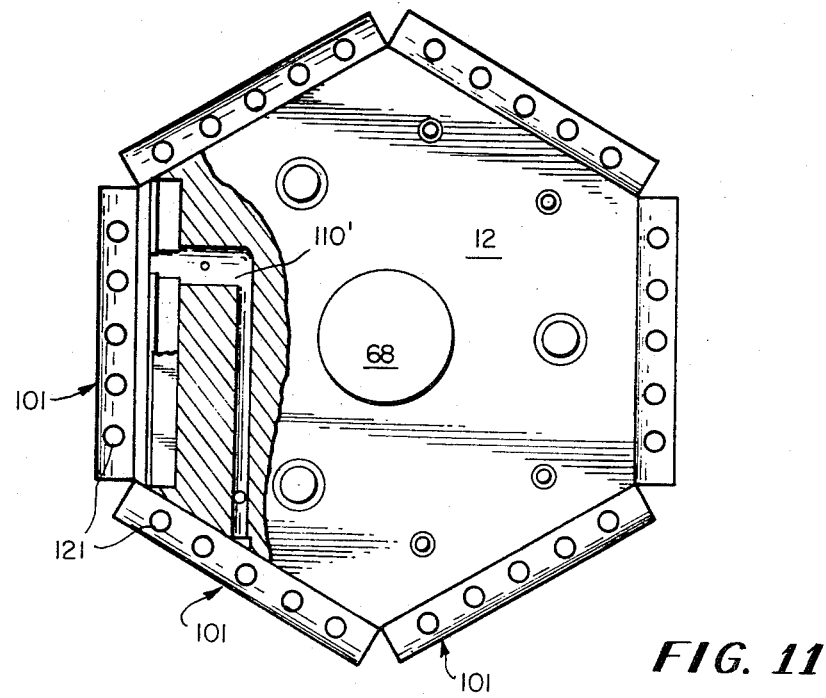
FIG. 11 is a top plan view with portions broken away and shown in section of the turret which carries the parison pins.
Figure 13:
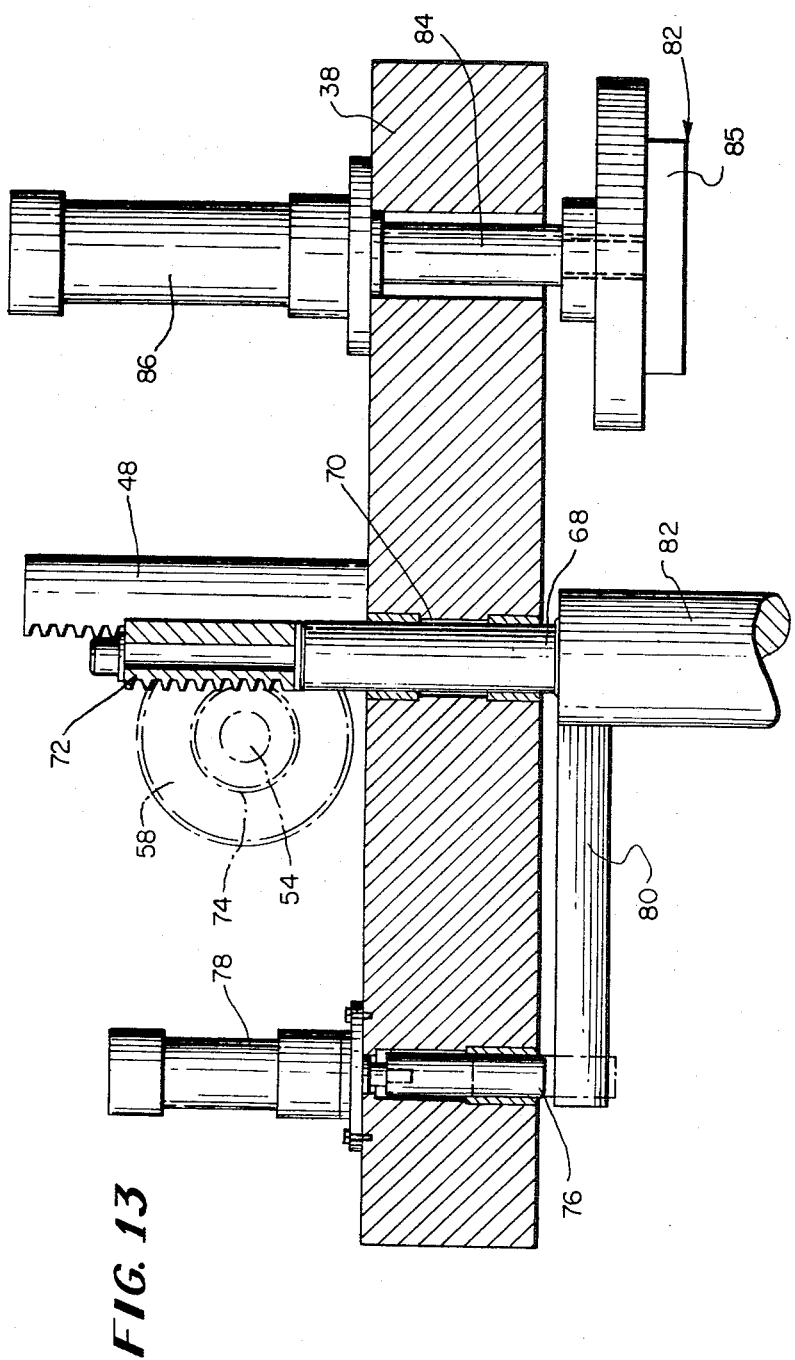
FIG. 13 is a vertical sectional view taken on line 13—13 of FIG. 7 and showing the 60° stop arrangement for braking the turret into two return cycles and also showing the rack and pinion arrangement of FIG., 8 in more detail.

The electric motor 64 or similar rotary actuator moves the turret a full 120° counterclockwise so that the parison pins formerly at the parison mold stations 16 and 16a are moved into location at the blow mold stations 18 and 18a, as can be appreciated from a consideration of FIG. 6. The motor 64 is now active in the next cycle or in its return movement to move the turret shaft assembly 62 and the turret 12 a return or counterclockwise distance of 120°. However, the return indexing movement of the turret under the actuation of the 120° cyclic motor 64 is controlled and regulated by a stop pin 76 actuated by a hydraulic cylinder 78 mounted vertically on the press plate and located midway between the stations 16 and 18a. The pin engages a radial stop arm 80 carried by the outer hub 82 of the turret shaft assembly 62. The pin 76 will engage the arm 80 on the return swing of the turret as shown in FIG. 13, and will halt the turret so that the pins are located in the stations moving 60° successively counterclockwise from the station 18a. When the pin is retracted by the operation of the hydraulic cylinder 78, it will permit the turret to continue on its return movement a further 60° since the motor is in potential for a further 60° movement of the shaft assembly 62. Thus, it can be seen that the rotation of the turret 12 and its parison pins 14 is repeated continuously first 120° clockwise then two cycles of 60° counterclockwise.

The blow mold stations 18 and 18a are each composed of sectional mold clamps 83 which include a fixed lower mold half and a movable upper mold half 85, the former being mounted on the platen 26 while the latter is carried by the lower end of rams 84 forming a part of each of the two blow mold cylinders 86. The mold halves are brought together by the hydraulic cylinder 86 for each of the stations 18 and 18a with the parison pins being positioned by the turret 12 within the blow mold halves. The cylinders 86 operate under a lower pressure than the pressure of the parison mold cylinders 34 and 34a.

At the blow mold stations introduction of air under pressure through the parison pins causes expansion of the parisons on the pins until the parisons assume the form and size dictated by the interior shape and areal extent of the blow mold halves in their clamped complementary relation.

Figure 12:
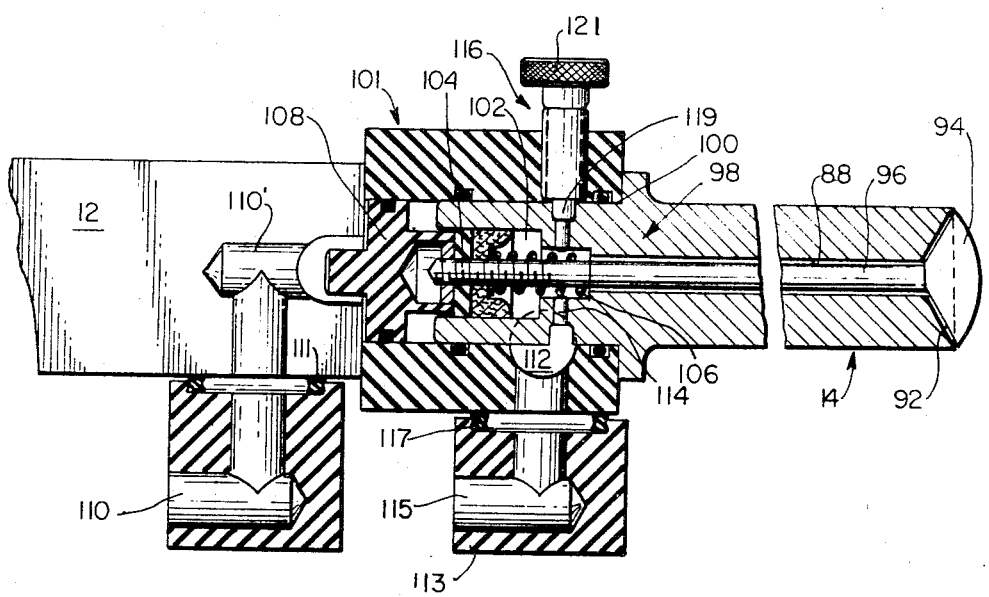
FIG. 12 is an enlarged vertical sectional view showing in detail the air inlets in the turret for each parison pin and showing the valve and valve stem for each pin.

As shown in FIG. 12, each parison pin 14 is hollow in that it is formed with an axial bore 88 that terminates at the outer end 90 of the pin in a valve seat 92 within which a valve body 94 is seated. The valve body 94 has an outer configuration complementing the end 90 of the pin so that when the valve is seated to prevent the inflow of plastic material into the pin, during the parison molding operation, the outer end of the pin has a configuration that contributes to the internal closed end of the parison.

The valve body 94 is carried by a vlave stem 96 that is slidably disposed within the axial bore 88 and is of a diameter less than the bore to permit of the passage of compressed air long the bore and past the valve when the valve is opened during the blow molding operation and at the ejection of the formed articles. The inner end portion 98 of the pin is fixed in a bore 100 provided in the face of a pin holding block 101 secured to the turret 12 and is formed with a counterbore 102 within which the externally threaded inner end portion 104 of the valve stem is disposed. The inner end portion 104 of the valve stem is provided with a spring biasing assembly 106 that acts to close the valve 94 and is attached to a piston unit 108 that is acted upon by the air pressure to unseat the valve. The compressed air from a passage means 110 on the bed of the machine connects to port 110' in the turret via O-ring seal 111 whereby the compressed air is actively admitted to the piston unit 108 and acts thereon to unseat the valve against the closing urgement of the spring assembly 106.

With the valve 94 unseated, during the blow molding operation, the air under pressure is passed along the parison pin 14 from an inlet passage means 112 in the turret 12, such passage means registering at one end with a radial port 114 in the inner end portion of the pin. The valve in each pin is also unseated when the pin is at the ejection station so as to permit the pressure air to cool the formed article on the pin prior to and as the article is being mechanically stripped from the pin.

The other end of passage 112 connects to a blow air inlet header 113 carried by the bed of the machine and containing passages 115 and O-ring seal 117.

Each core pin is releasably maintained in its bore in pin block 101 by a pin 116 having a stem portion 119, whereby when a pin requires replacement the stem 119 may be lifted from its mating bore in the pin by the head 121 thereby reducing shut down time to a minimum.

After the parisons are expanded into their final shape at the blow mold stations 18 and 18a, the turret 12 is indexed to bring the pins 14 to the ejection stations 20 and 20a. Each of the ejection stations, as shown in FIGS., 9 and 10, is provided with a mechanical means 118 for positively and quickly moving the formed articles off the pins 14, such means being operative to dependably strip the articles off the pins. Such stripper means includes a block 120 having a number of upstanding U-shaped fingers 122 provided on its upper face and in the crotch of which the pins 14 are placed as the turret is indexed around to and lowered at the ejection stations. The blocks 120 are carried by guide rods 122 that are adjustably and slidably positioned in tubular supports or guide cylinders 124 on the platen 26 and the blocks are connected by pivot pins to the upper ends of vertically disposed actuating links 128 which have their lower ends pivotally connected to the outer ends of actuating piston rods 130. The piston rods are workingly carried by generally horizontally disposed hydraulic cylinders 132 pivoted at 133 in side by side oppositely facing relation on common supports 134 below the turret shaft assembly 62. The cylinders are set up to operate in coordinated movement so that the links or bars 128, which are pivotally supported intermediate their ends on pivot links 135 carried by brackets 136, are moved in and out in unison and, in their inward and outward swinging movements, the bars with their stripper fingers 122 strip the articles from the parison pins. The fingers 122 engage behind the articles and, as the links or bars swing outwardly, the fingers move the articles off the parison pins 14. By means of the pivot links 135 and the pivotal mountings for the cylinders 132 the blocks 120 are provided with straight line reciprocating motion.

It is believed in the light of the foregoing description taken in conjunction with the accompanying drawings that the operation of the injection blow molding machine 10 will be quite apparent to those skilled in the art and, therefore a more detailed explanation of the operation will not be given. It is to be understood that all that is presented herein is a description and showing of a preferred embodiment of the invention and many changes and modifications may be made as come within the accompanying claims which define the true spirit of the invention apart from the illustrated and described embodiment as briefed in the Abstract.

What is claimed is:

1. An injection blow molding apparatus having plural operating stations for automatically forming hollow articles of plastic material comprising a horizontally disposed turret rotatable and elevatable in respect to said plural stations and having side faces, distinct sets of parison pins carried by and projecting from the side faces, said operating stations being angularly spaced apart and surrounding the turret with its parison pins, first means at one of the stations to mold parisons on the pins and including separable mold halves, hydraulic rams clamping the mold halves together about the pins, means for injecting plastic melt into the closed mold halves about the pins therein, second means at another station to expand the parisons on the pins to articles of final shape and size and including separable blow mold halves and hydraulic rams clamping the blow mold halves about the pins therein, said turret being connected to a source of compressed air and said parison pins being hollow and in communication with the pressure air for the passage of the pressure air through the pins to expand the parisons, said pins having valves controlling the passage of pressure air therethrough, and third means at a third station for positively mechanically removing formed articles from the parison pins.

2. The invention of claim 1 wherein means is provided and controlled by the rams for the parison molds to maintain the parison pins always equidistant in a vertical direction between the halves of the parison and blow molds.

3. The invention of claim 1 wherein said third means includes mechanical stripper fingers in which the parison pins with the blown articles thereon are adapted to fit with the fingers engaging behind the formed articles on the pins and means for moving the fingers outwardly along the longitudinal axes of the pins to strip the articles off the pins.

4. The invention of claim 1 wherein said parison pins have open outer ends, the inner surface of said open outer ends defining seats for the valves, said valves having stems slidably positioned lengthwise of the pins and having inner ends disposed at the inner turret ends of the pins, spring means connected to the inner ends of the valve stems for maintaining said valves closed and means on the inner ends of the valve stems and actuated by the air pressure for unseating the valves.

5. The invention of claim 1 including means for first indexing the turret an angular distance in one direction in respect to said stations to place certain of the pins at said parison forming station in one full movement and for then indexing it in the other direction in a step by step movement of increments one half the total movement in the first direction to place said certain pins sequentially at said blow mold station and then said third station.

6. In an injection blow molding apparatus having plural operating stations for automatically forming hollow articles of plastic material, a turret rotatable and elevatable in respect to said plural stations and carrying parison pins, a parison mold station including a separable parison mold having a fixed bottom mold half and a movable top mold half, a hydraulic ram carrying said movable mold half and clamping the mold halves about the parison pins therein, and means connecting said ram to the turret so that the turret is elevated by the ram as the movable mold half is raised with the turret being raised one half the distance of the movable mold half.

* * * * *